Aug. 25, 1959  K. F. SHOSTED  2,901,595
UNIVERSAL SPOTLGHT MECHANISM
Filed Oct. 9, 1958
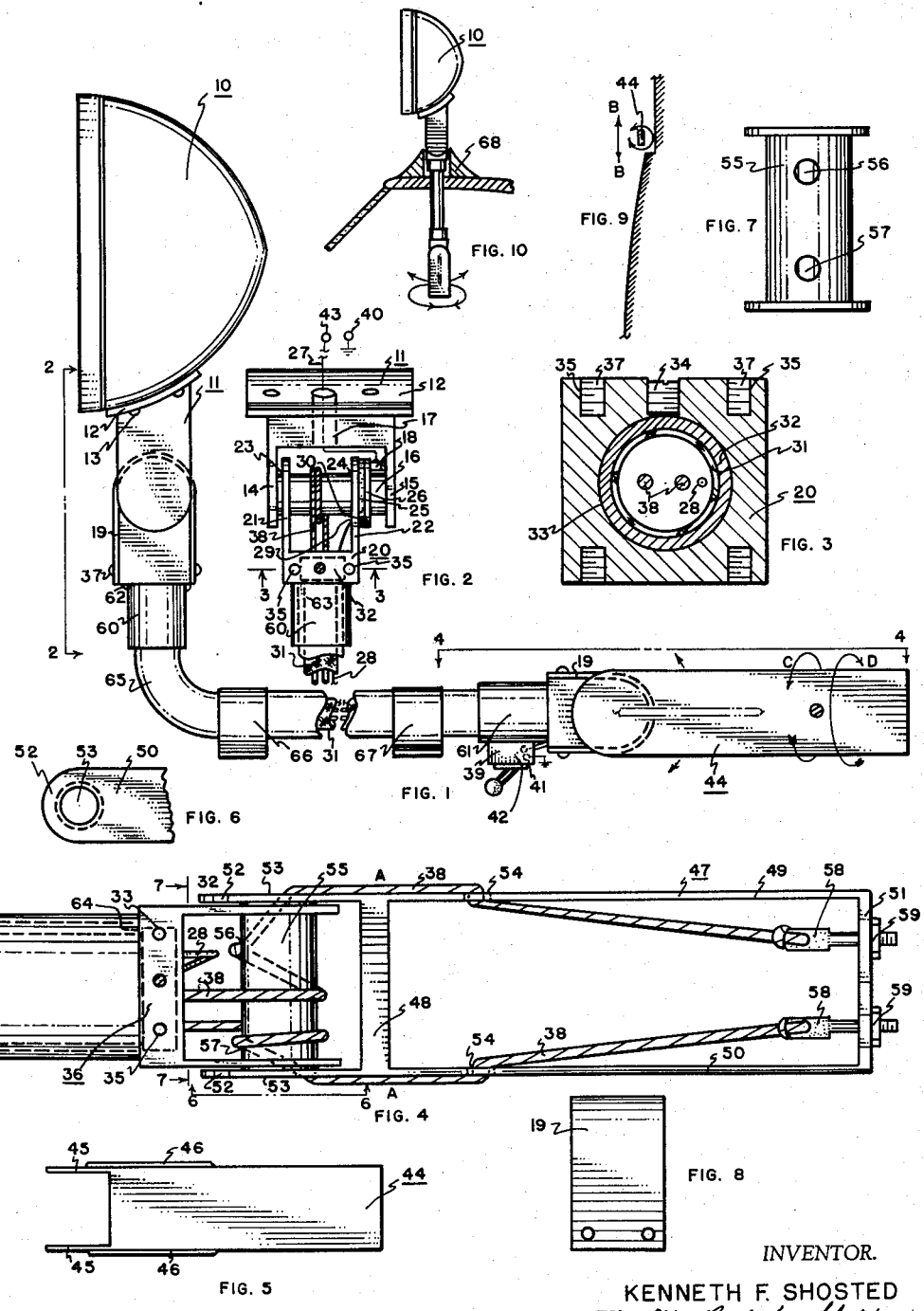
INVENTOR.
KENNETH F. SHOSTED
BY M. Ralph Shaffer
HIS ATTORNEY

United States Patent Office 2,901,595
Patented Aug. 25, 1959

2,901,595

UNIVERSAL SPOTLIGHT MECHANISM

Kenneth F. Shosted, Murray, Utah

Application October 9, 1958, Serial No. 766,256

6 Claims. (Cl. 240—61.13)

This invention relates to universal-type spotlight mechanisms which are manually controllable from a point remote from the spotlight itself, and more particularly to a new and improved universal spotlight mechanism wherein the manual control is twisted for accomplishing horizontal deflection of the spotlight and pivoted to accomplish the vertical deflection or dipping thereof, the design being such that the manual control of the mechanism requires minimal displacement and space, both convenient, for actuation thereof for accomplishing the light orientation function.

Universal spotlight or headlight mechanisms are not new. Many types of universal, controllable lamps incorporate within their design an actuating handle which when twisted will accomplish the horizontal deflection or sweeping of the lamp beam. This is accomplished quite generally by means of a flexible cable, wire or other elongate member, the member being fixedly coupled in some manner to the actuating handle and to the light. The present invention uses a flexible cable also, though its mountings and securement are somewhat different from those which are conventionally found to exist.

To accomplish deflection of the light housing in a vertical direction (generally known as dipping), a large number of current, universal spotlight mechanisms employ simply a length of wire disposed in the aforementioned flexible tubing, sometimes referred to as a "Bowden wire." Hence, dipping in these instances is produced simply by the operator pulling on the connecting wire for downward light displacement, and pushing on the wire for upward light displacement, since the wire itself is, quite generally, rigidly attached to the light housing. The principal problem which occurs in connection with such universal light mechanisms is that the light will not hold its orientation once the operator removes his hand from the Bowden wire control; rather, the light will return to its quiescent position. In those instances where, with use of the Bowden wire technique, the light does in fact maintain a selected orientation, it will be because of the sliding friction existing between the Bowden wire and its casing. While this friction is desirable for ensuring maintenance of light orientation, yet such produces the inevitable wearing of both wire and casing, resulting in a shortening of the useful life of the equipment.

Other than the Bowden wire technique, some designs of universal light mechanisms extant appear to employ rather cumbersome levers and mechanical linkages, expensive to manufacture and quite cumbersome to operate. These latter generally require a great deal of space both for the physical storage, mounting and actuation thereof. The present invention is believed to avoid the above difficulties by employing in what is believed to be a novel pulley-type arrangement wherein maintenance of light orientation is ensured without requiring the Bowden wire friction heretofore referred to; further, the present device enables the provision of a manual control which is both pivotal and twistable in manipulation, necessitating minimum displacement and space, both for mounting and for actuation, to obtain a maximum effect.

Accordingly, an object of the present invention is to provide an improved universal spotlight mechanism.

A further object of the present invention is to provide an improved universal spotlight mechanism designed to effect maintenance of a desired spotlight orientation without deleterious effects upon its component parts and, further, will take up a minimum space both for mounting and for actuating.

According to the present invention, a universally controllable spotlight is provided with mounting means, the latter having a pair of depending ears with a control cable cylinder disposed therebetween and securely affixed thereto. A clevis connector also having a pair of ears are provided with aligned apertures in said ears, the cable cylinder of the mounting means being journaled through these apertures. Hence the mounting means and the clevis connector enjoy pivotal cooperation with respect to each other. The clevis connector is provided with a base bore, a bearing surface disposed therearound, and a fixed sleeve concentric with the base bore and surrounding the aforementioned bearing surface. A twistable, pivotable, manual control is provided with forwardly extending ears and a cable cylinder disposed therebetween and securely affixed thereto. A second clevis connector having a similar pair of ears is provided with aligned apertures at these ears, the aforementioned cable cylinder of the manual control being journaled within these aligned apertures for pivotal cooperation therewith. This latter clevis connector is also provided with a base bore, a bearing surface disposed therearound, and a fixed sleeve concentric with the aforementioned base bore and surrounding the associated bearing surface. An inner, elongate, flexible conduit member is provided with end collars, the latter being respectively seated within the base bores of the aforementioned clevis connectors. An outer, elongate, conduit member surrounds the inner flexible member and has its ends disposed inwardly of the aforementioned sleeves with the ends thereof abutting the aforementioned bearing surfaces. Cable drive means is wrapped around the two cable cylinders and extends therebetween. The mechanism is supplied with a light switch which is disposed in proximity with the manual control.

The aforementioned outer conduit may be provided with a series of mounting clamps for attaching the mechanism to the chosen exterior of an automobile or boat; this outer conduit is manually deformable preferably such that by means of hand pressure the conduit may be bent into a suitable configuration for mounting to the vehicle in a desired manner.

The features of the present invention which are believed to be novel are set forth with particularity in the amended claims. The present invention, both as to its organization and manner of operation, together with further objects and advantages thereof, may thus be understood by reference to the following description, taken in connection with the accompanying drawings in which:

Figure 1 is a side elevation of a universal spotlight mechanism according to the present invention.

Figure 2 is a fragmentary view taken along the line 2—2 in Figure 1 and, with the protective U-shaped cover shown as removed and the light mounting means slightly enlarged at the right side thereof for purposes of clarity, illustrates the cable drive of the mechanism.

Figure 3 is a section taken along the line 3—3 in Figure 2.

Figure 4 is an enlarged fragmentary view taken along the line 4—4 in Figure 1 and illustrates with particularity the construction of the actuating handle of the mechanism and its cooperation with the rest of the structure.

Figure 5 is a plan view of the handle cover employed by the present invention; its side elevation is illustrated in Figure 1.

Figure 6 is a fragmentary view of reduced size taken along the line 6—6 in Figure 4.

Figure 7 is a view taken along the line 7—7 in Figure 4 illustrating the handle cable cylinder as having cable admittance apertures.

Figure 8 is a front elevation of the U-shaped protective cover employed by the present invention in two places as shown in Figure 1, the cover being removed from the mechanism in Figure 2 for purposes of clarity.

Figure 9 illustrates that, for actuation of the mechanism, the handle member is either twisted or pivoted up and down; hence, the device and associated handle may be mounted very closely to the side of an automobile, for example, near the wind-wing window thereof.

Figure 10 illustrates that the mechanism might conceivably be mounted vertically and disposed through an automobile top or roof; Figure 10 is partially in cross section and illustrates one manner in which the mechanism may be mounted to the automobile roof top, passing therethrough.

In the drawings the base of spotlight housing 10 is mounted to mounting means 11 by flange 12 and rivets or screws 13. Mounting means 11 is provided with a pair of depending ears 14 and 15 between which is securely affixed a cable cylinder 16. Cylinder 16 may be joined to ears 14 and 15 by means of welding or soldering, for example. As shown, mounting means 11 includes an aperture 17 which is designed to accommodate the disposition therewithin of the electrical connector or wire lead 27 from the light housing 10, this wire upon passing through aperture 17 attaching to electrical brush contact 18 and the latter being securely mounted to mounting means 11 in any conventional manner.

In Figure 2 the U-shaped protective cover 19 shown in Figures 1 and 8 is removed for purposes of clarity to illustrate the cable drive of the mechanism.

Clevis connector 20 has a pair of upwardly extending ears 21 and 22, these being provided with apertures 23 and 24 accommodating the slidable, pivotal disposition therewithin of cylinder 16. Hence, clevis connector 20 enjoys a pivotal relationship with respect to mounting means 11. Affixed to the outer surface of ear 22 and surrounding cylinder 16 is an insulation ring 25 mounting conductive ring 26 to clevis connector 20. It should be mentioned that conductive ring 26 does not touch or otherwise come in electrical contact with cylinder 16. As is seen in Figure 2, lead 27 passes through aperture 17 and is connected directly to electrical brush 18. Electrical brush 18 is preferable of the spring-loaded type and hence is in constant contact with conductive ring 26. Conductive ring 26 itself finds connection with electrical connector or wire lead 28 through suitable apertures 29 and 30 in ear 22 and insulating ring 25, respectively. A flexible, elongate, inner conduit member 31 is provided with collars 32 at both ends thereof, these being secured within bores 33 by means of set screws 34. The apertures 35 are provided in clevis connector 20 (and also clevis connector 36 in Figure 4) to accommodate mounting screws 37 (shown in Figures 1 and 3), the screws serving to mount the two U-shaped protective covers one of which is illustrated in Figure 8.

The cable 38 in Figures 2 and 4 is preferably a metallic cable and is wrapped around cylinder 16 in Figure 2 as shown, passing through flexible conduit 31 to the handle mechanism shown in Figure 4. The electrical connector 28 also passes through flexible conduit 31 to the handle mechanism and from thence to switch 39 in Figure 1. It should be mentioned at this juncture that electrical contacts 40 and 41 of the light and switch, respectively, will be maintained ground potential, being directly connected to the units themselves. The "hot" terminal 42 of the switch is directly connected to electrical connector 28 (see Figures 1 and 4). Electrical lead 27 is in turn directly connected to terminal 43 of light 10.

Handle cover 44 shown in Figures 1 and 5 has a pair of ears 45 and outwardly protruding beads 46. These beads serve as recesses for portions A of cable 38 (shown in Figure 4) and also may serve to secure the handle cover 44 to its assembly.

In Figure 4 the handle cover 44 has been removed so as to illustrate clearly a structure of handle member 47. Handle member 47 may be of a square, U-shaped cross section as illustrated in Figure 4 and may include stiffening partition 48; otherwise handle member 47 has sides 49 and 50 and base 51 which may all be of uniform width, except for the rounded ends 52 illustrated in Figures 4 and 6. The ends 52 of handle member 47 are also provided with aligned apertures 53. Cable readmittance apertures 54, disposed in the side walls of handle member 47, are also supplied.

Of particular interest in Figure 4 is the fact that hollow cylinder 55, in registry with apertures 53, is provided with a pair of wall apertures 56 and 57 (see Figure 7); the purpose for these apertures becomes clear by reference to Figure 4. It will be noted in Figure 4 that the cable 38 is wrapped around the hollow cylinder 55, passes through wall apertures 56 and 57, respectively, and journeys on either side (outside) of handle member 47 to enter readmittance apertures 54 and ultimately attached to anchor bolts 58, the latter having nut attachments 59 butting against base 51. The anchor bolts 58 may simply comprise eye bolts, which may be tightened down by means of nuts 59 so as to increase the tension upon cable 38, thereby maintaining a positive cooperation of the entire mechanism. The purpose for the various apertures 56 and 57, 53 and 54 are to supply this cable tightening feature.

It will of course be understood that a rubber or plastic handle grip may be disposed over the handle cover 44 in Figure 5, the handle grip taking any desired cross-section. In any event, it is noticed (with reference to Figure 9) that when the handle 44 is pivoted or rotationally displaced in the vertical space-plane as is indicated by the arrow BB, hollow cylinder 55 will also be caused to rotate; such rotation produces, via cable 38, the rotation of cylinder 16 in Figure 2 so as to cause the dipping or pulling up, as the case may be, of light housing 10.

A word about the horizontal deflection of the light. Sleeves 60 and 61 are securely affixed to their respective clevis connectors by means of welds 62, for example. It is noted in Figure 3 that each of the clevis connectors is provided with a bore 33. Disposed between the exterior of this bore and the interior of the sleeve is a respective bearing surface 63 (see Figure 2) and bearing surface 64 (see Figure 4) against which the respective ends of outer conduit member 65 will abut. Outer conduit member 65 will be clamped to the vehicle by means of clamps 66 and 67 in a conventional manner. When handle member 47 in Figure 1 is twisted in a direction indicated either by the arrow C or by the arrow D, the handle member and its sleeve will be caused to rotate about the end of outer conduit member 65. This in turn produces a rotation of sleeve 60 relative to the other end of the outer conduit member 65 by virtue of the inclusion of flexible conduit member 31 (see Figures 1 and 2). This is by virtue of the fact that the inner flexible conduit 31 is securely anchored to both clevis connectors by means of the securing of the collars 32 within their respective bores. Thus, the ends of the outer connector turn, in effect (actually the reverse is true), relative to the sleeves 60 and 61 and their clevis connectors so that this twisting is translated to spotlight 10.

Outer conduit member 65 is manually deformable, preferably, such that by means of hand pressure the conduit may be bent into a suitable configuration for mounting to the vehicle in a desired manner.

If desired, the apparatus may of course be installed in and through a car top for police work, for example. In Figure 10 this is illustrated, with the ferrule 68 serving as an all-weather protector.

It will be noted in the present invention that regardless of the particular orientation of the spotlight, that orientation will not be disturbed by the operator removing his hand from handle cover 44. Another important feature to note is that where cylinder 16 in Figure 2 is smaller than cylinder 55 in Figure 4, which condition is illustrated in the drawings, then a slight rotation of handle member 44 will produce a marked effect upon the dipping action of light housing 10.

If desired, a completely positive drive of the mechanism may be ensured by providing radial, aligned apertures in the wall of cylinder 16, disposing cable 38 therethrough.

While particular embodiments of the present invention have been shown and described, it will be obvious to those skilled in the art that changes and modifications may be made without departing from this invention in its broader aspects and, therefore, the aim in the appended claims is to cover all such changes and modifications as fall in the true spirit and scope of the invention.

I claim:

1. A universal spotlight mechanism having a twistable, manual control pivotal in a space-plane parallel to the orientation of said mechanism and requiring a minimal displacement for maximum effect, said mechanism including, in combination: a spotlight; mounting means affixed to said spotlight and including a pair of depending ears and a first, cable cylinder disposed between and securely affixed to said ears; a first clevis connector having a pair of ears provided with aligned apertures, said first cable cylinder being journaled therewithin for pivotal cooperation with said first clevis connector, said clevis connector also being provided with a base bore, a bearing surface disposed therearound, and a fixed sleeve concentric with said base bore and surrounding said bearing surface; a twistable, pivotal, manual control having forwardly extending ears and a second, cable cylinder disposed between and securely affixed to said ears; a second clevis connector having a pair of ears provided with aligned apertures, said second cable cylinder being journaled therewithin for pivotal cooperation with said second clevis connector, said second clevis connector also being provided with a base bore, a bearing surface disposed therearound, and a fixed sleeve concentric with said base bore and surrounding said bearing surface; a flexible, elongate, inner conduit member having end collars respectively affixed within the said base bores of said first and second clevis connectors; an elongate, outer conduit member disposed within said clevis connector sleeves and encompassing said flexible inner conduit member, the bearing surfaces of said clevis connectors abutting the ends of said outer conduit member for rotational displacement thereon; cable drive means wrapped around said cable cylinders and extending therebetween; a light switch disposed in proximity with said manual control; means for electrically intercoupling said spotlight with said light switch; and clamp means for fixedly attaching said outer, conduit member to a vehicle.

2. A mechanism according to claim 1 in which said first, cable cylinder is substantially smaller in diameter than said second, cable cylinder.

3. A mechanism according to claim 1 in which said electrically intercoupling means comprises a conductive ring affixed to but insulated from one of said ears of said first clevis connector, a brush contact mounted to said mounting means and disposed in electrical contact with said conductive ring, first electrical connector means intercoupling said spotlight with said brush, and second electrical connector means intercoupling said conductive ring with said switch, said switch and spotlight also being electrically ground-connected together.

4. A mehanism according to claim 1 in which said outer conduit member is manually deformable.

5. A mechanism according to claim 1 in which said second, cable cylinder is hollow and is provided with a pair of wall apertures, said manual control ears also being provided with apertures communicating with said hollow cable cylinder, and said manual control is provided with cable readmittance apertures and with adjustable, cable tightening anchor bolts and attachments, said drive cable being wrapped around said second cable cylinder, disposed through said cylinder wall apertures and out the respective cylinder ends and communicating apertures, back into said manual control via said readmittance apertures, and affixed to said anchor bolts.

6. A universal spotlight mechanism having a twistable, manual control pivotal in a space-plane parallel to the orientation of said mechanism and requiring a minimal displace for maximum effect, said mechanism including, in combination: a spotlight; mounting means affixed to said spotlight and including a pair of depending ears and a first, cable cylinder disosed between and securely affixed to said ears; a first clevis connector having a pair of ears provided with aligned aertures, said first cable cylinder being journaled therewithin for pivotal cooperation with said first clevis connector, said clevis connector also being provided with a base bore, a bearing surface disposed therearound, and a fixed sleeve concentric with said base bore and surrounding said bearing surface; a twistable, pivotal, manual control having forwardly extending ears and a second, cable cylinder disposed between and securely affixed to said ears; a second clevis connector having a pair of ears provided with aligned aertures, said second cable cylinder being journaled therewithin for pivotal cooperation with said second clevis connector, said second clevis connector also being provided with a base bore, a bearing surface disposed therearound, and a fixed sleeve concentric with said base bore and surrounding said bearing surface; a flexible, elongate, inner conduit member having end collars respectively affixed within the said base bores of said first and second clevis connectors; an elongate, outer conduit member disposed within said clevis connector sleeves and encompassing said flexible inner conduit member, the bearing surfaces of said clevis connectors abutting the ends of said outer conduit member for rotational displacement thereon; cable drive means wrapped around said cable cylinders and extending therebetween; first and second covers longitudinally enveloping said clevis ears of said first and second clevis connectors, respectively, said covers being removably affixed to said clevis connectors; a light switch disposed in proximity with said manual control; means for electrically intercoupling said spotlight with said light switch; and clamp means for fixedly attaching said outer, conduit member to a vehicle.

References Cited in the file of this patent

UNITED STATES PATENTS

| 1,419,603 | Beam | June 13, 1922 |
| 2,281,047 | Pennow | Apr. 28, 1942 |
| 2,510,319 | Sauer | June 6, 1950 |
| 2,712,060 | Johnson | June 28, 1955 |
| 2,734,997 | Frady | Feb. 14, 1956 |

OTHER REFERENCES

Frei: German application Serial No. F11597, printed April 19, 1956 (KL. 63c 6620).